United States Patent
Ekler

(10) Patent No.: US 8,901,868 B2
(45) Date of Patent: Dec. 2, 2014

(54) STARTING SENSORLESS BRUSHLESS DIRECT-CURRENT (BLDC) MOTORS BASED ON CURRENT-RIPPLE ANALYSIS

(75) Inventor: Markus Ekler, München (DE)

(73) Assignee: Atmel Corporation, San Jose, CA (US)

( * ) Notice: Subject to any disclaimer, the term of this patent is extended or adjusted under 35 U.S.C. 154(b) by 420 days.

(21) Appl. No.: 13/110,778

(22) Filed: May 18, 2011

(65) Prior Publication Data

US 2012/0293101 A1    Nov. 22, 2012

(51) Int. Cl.
*H02P 6/18* (2006.01)
*H02P 6/20* (2006.01)
*H02P 6/00* (2006.01)

(52) U.S. Cl.
CPC *H02P 6/181* (2013.01); *H02P 6/20* (2013.01); *H02P 6/002* (2013.01); *H02P 6/182* (2013.01)
USPC ........... 318/400.34; 318/400.01; 318/400.32; 318/400.33; 318/599; 318/799

(58) Field of Classification Search
USPC ............. 318/400.01, 400.14, 400.32, 400.34, 318/560, 599, 721, 799, 811, 400.21, 432, 318/434, 801, 400.33; 388/811, 819, 901
See application file for complete search history.

(56) References Cited

U.S. PATENT DOCUMENTS

| | | | |
|---|---|---|---|
| 2003/0107341 A1* | 6/2003 | Morris | 318/599 |
| 2007/0040523 A1* | 2/2007 | Quirion et al. | 318/434 |
| 2008/0197794 A1* | 8/2008 | Vermeir et al. | 318/400.06 |
| 2009/0026991 A1* | 1/2009 | Boscolo Berto | 318/400.35 |

* cited by examiner

*Primary Examiner* — Antony M Paul
(74) *Attorney, Agent, or Firm* — Baker Botts LLP

(57) ABSTRACT

In one embodiment, a method includes measuring between two consecutive electrical commutations of a brushless direct-current (BLDC) motor a current through the BLDC motor. One or more pulse-width-modulation (PWM)-configurable signals are driving the BLDC motor. The method includes determining a waveform of the current through the BLDC motor; if the waveform of the current through the BLDC motor comprises a first type, then increasing a duty cycle of each of one or more of the PWM-configurable signals driving the BLDC motor; and, if the waveform of the current through the BLDC motor comprises a second type, then decreasing a time interval between electrical communications of the BLDC motor.

25 Claims, 4 Drawing Sheets

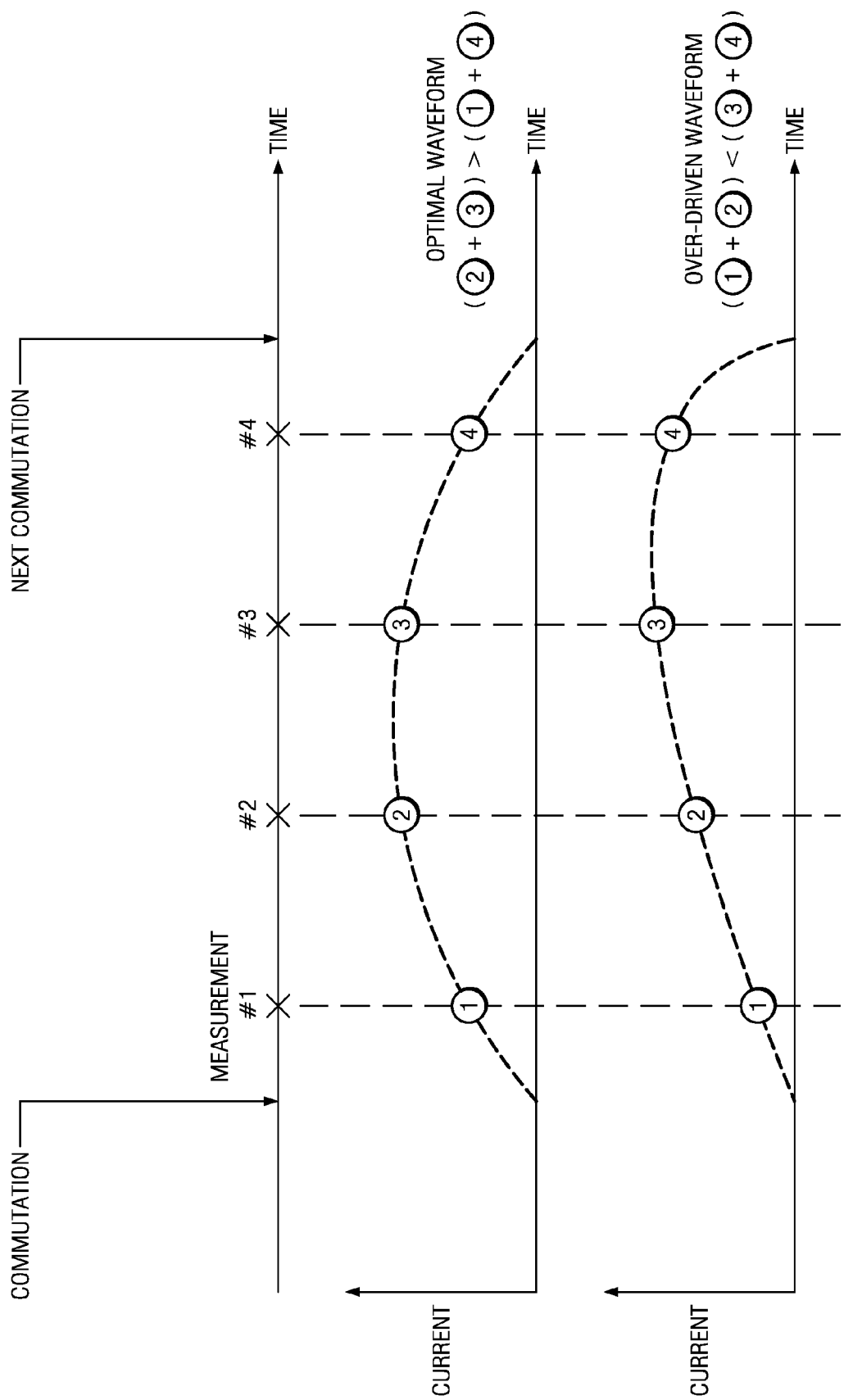

STARTING SENSORLESS BRUSHLESS DIRECT-CURRENT (BLDC) MOTORS BASED ON CURRENT-RIPPLE ANALYSIS

TECHNICAL FIELD

This disclosure generally relates to electrical motors.

BACKGROUND

A brushless direct-current (BLDC) motor may include a rotor and a stator, with one or multiple permanent magnets forming the rotor and electromagnets forming the stator. The electromagnets in the stator may be coils of wire. A control circuit may electronically commutate current driven through the coils to control the position or orientation of the rotor. BLDC motors tend to be more reliable than standard DC (mechanically commutated) motors.

BRIEF DESCRIPTION OF THE DRAWINGS

FIG. 5 illustrates example waveforms measured by the example method of FIG. 4.

DESCRIPTION OF EXAMPLE EMBODIMENTS

Figure 1:
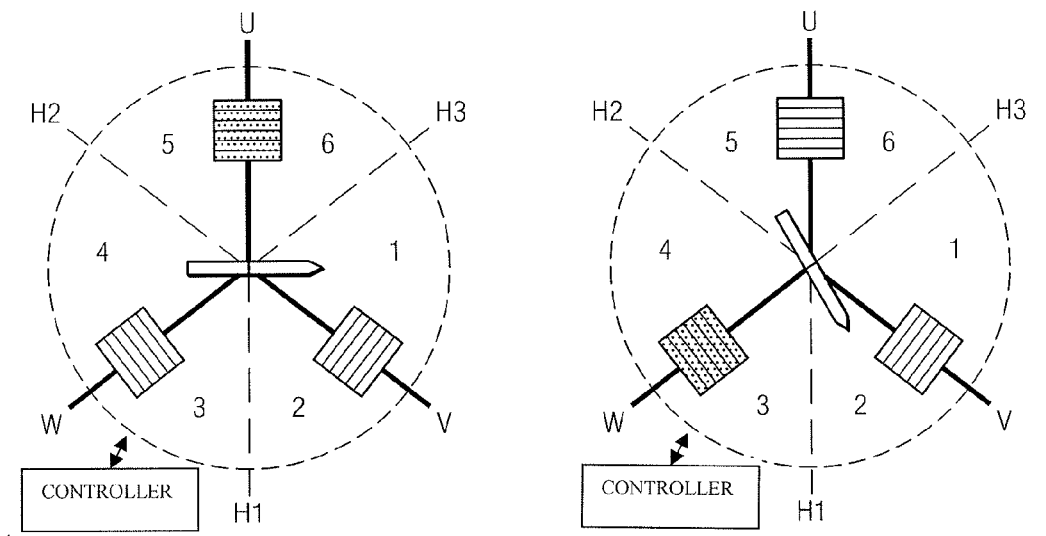
FIG. 1 illustrates a functional model of a BLDC motor with two successive rotor positions.

FIG. 1 illustrate a functional model of a BLDC motor with two successive rotor positions. In the example of FIG. 1, three coils of wire are arranged in three directions U, V, and W. A rotor (formed by a permanent magnet) is shown as a bar magnet with its rotary axis at the intersection of the three axes U, V, and W and perpendicular to the plane of the three axes. The orientation or position of the bar magnet may be controlled by driving a configuration of currents through the coils. For example, the bar magnet may come to position "1" when a current is driven from the coil at W to the coil at V and may come to position "4" (opposite position "1") when a current is driven in the opposite direction, from the coil at V to the coil at W. The motion of the rotor may induce alternating voltages (called back-electromotive-force (BEMF))) within the coils, and the amplitude of the BEMF may be proportional to the angular speed of the rotor. The BEMF may be modeled as a voltage source in series with each coil that has a voltage amplitude proportional to the speed of the rotor. The BEMF voltage may vary with the angle between the coil axis and the angle of the rotor, and the resulting shape of the BEMF may be sinusoidal, triangular, or trapezoidal or a combination of these shapes.

Figure 2:
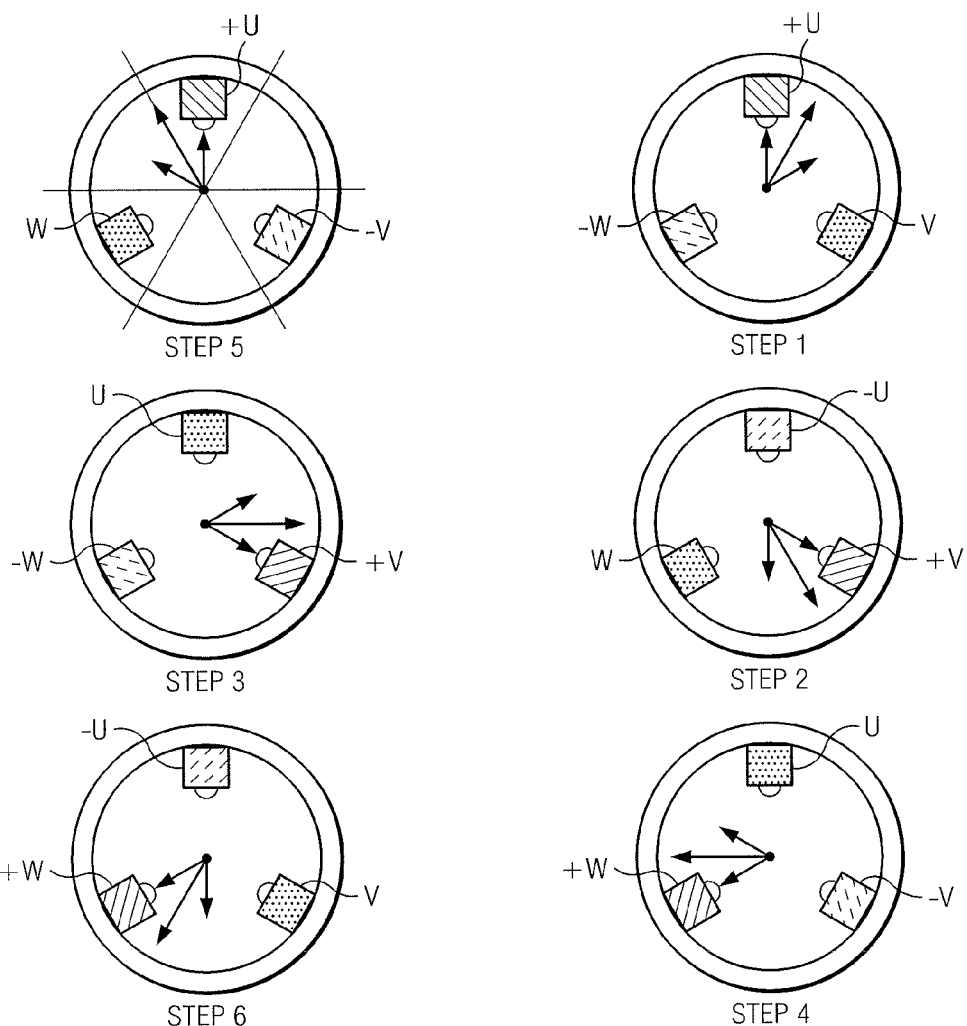
FIG. 2 illustrates one electrical revolution of the BLDC motor modeled in FIG. 1.

FIG. 2 illustrates one electrical revolution of the BLDC motor modeled in FIG. 1. The polarities of two coil currents with one coil left unconnected define six different positions for the rotor. Switching the coil currents so that they pull the rotor from one position to the next may cause the rotor to turn. Each position of the rotor may be associated with a configuration of coil currents by a switching sequence. The coils may be powered through switches (e.g. power metal-oxide-semiconductor field-effect transistors (MOSFETs)) controlled by a PWM-block commutation scheme to provide effective voltage values. A controller (which may be a circuit) to the motor may include the fast switches.

Figure 3:
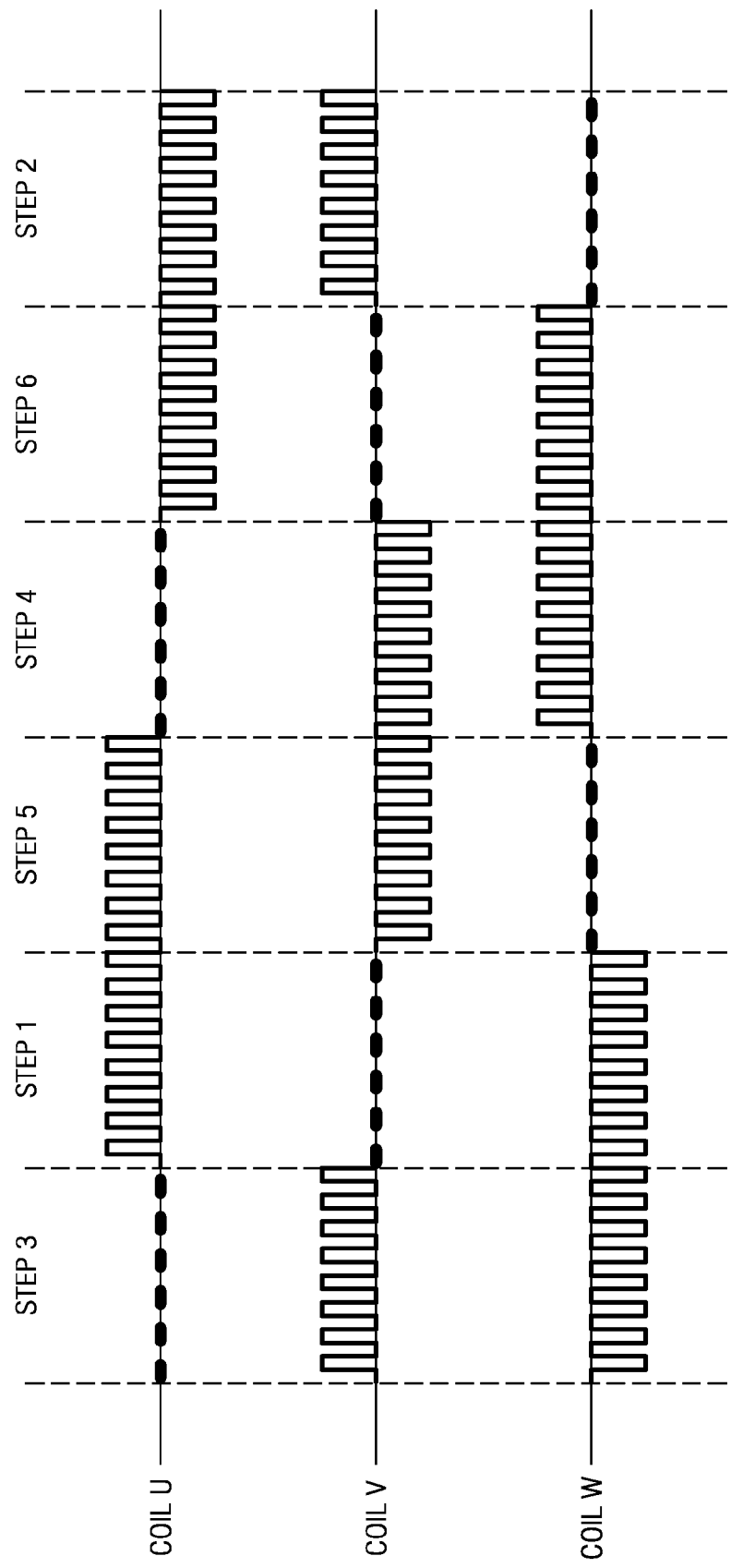
FIG. 3 illustrates an example pulse-width-modulation (PWM)-block commutation scheme for the electrical revolution illustrated by FIG. 2.

FIG. 3 illustrates an example PWM-block commutation scheme for the electrical revolution illustrated by FIG. 2. For each commutation step, one terminal (U, V, or W) may be connected to ground, one terminal may be connected to a power supply, and one terminal may be left open. Permanent connection to ground and the power supply may drive a maximum current through the coils of the motor and turn it with a maximum speed possible for a given motor load with a given supply voltage. For the PWM-block commutation scheme, each sector of the rotor may be mapped to the successive sector concerning current switching. In other words, the PWM-block commutation scheme may be described as a periodic sequence of 0Z11Z0, where 0 is connection to ground, Z represents an open terminal, and 1 is connection to a supply voltage. This sequence may delayed by two steps for each successive terminal. The sequence of steps 123456 may correspond to U=Z00Z11, V=11Z00Z, and W=0Z11Z0. In the opposite direction, the sequence of steps 654321 may correspond to U=11Z00Z, V=Z00Z11, and W=0Z11Z0.

Each block of PWM signals may provide an effective current driven through a particular coil (at U, V, or W) to generate an attractive or repulsive magnetic force applied to the bar magnet. Combinations of PWM blocks may provide electrical commutations of the coils and create rotary motion of the bar magnet. Additionally, the controller to the motor may control the rotation speed of the BLDC motor by adjusting the duty cycles of the PWM signals (and thus the effective average currents driven through the coils, which is in direct relation to the applied torque).

To switch the coils (or electromagnets) at the right rotor positions, Hall sensors may be arranged in the stator. In a sensorless BLDC motor, these sensors are not present and a BEMF method may be used to control the motor. A BEMF method may measure the position and speed of the rotor by detecting an induced voltage generated by movement of the rotor (a permanent magnet) close to a non-driven or electromagnet. The controller may evaluate this change in voltage. The induced voltage in an electromagnet may depend on the change of magnetic flux around the solenoid and thus depend on the rotation speed of the rotor. As a result, a BEMF method may be effective only when the rotation speed of the rotor (and thus the amplitude of the induced voltage) is high enough to be evaluated.

To control a BLDC motor with a BEMF method, it may be necessary to accelerate the motor from an idle state to a rotation speed that provides substantially stable BEMF. This may be done by switching the electromagnetic coils in a predefined sequence at predefined times. However, when using a predefined set of PWM cycles at predefined timeslots to drive the electromagnets, the rotor may stall (resulting in there being no detectable BEMF voltage) or changes in load on the motor could overdrive the motor (e.g. too much torque may be applied to the rotor). For example, the rotor may stall for a revolution or stop if the torque provided by the PWM duty cycle is too low for the applied drive load. As another example, if the torque provided by the PWM duty cycle is too high, the motor may generate noise and run irregularly.

Particular embodiments may evaluate current through the electromagnets between electrical commutations. Particular embodiments may measure current through the electromagnets several times between electrical commutations and evaluate the current waveform using these measurements. In particular embodiments, the following waveforms or motor states may appear: (1) "optimum"; (2) "overdrive"; (3) "underdrive"; and (4) "blocked." An optimum waveform may be similar to a rectified sine wave. It may rise at first, reach its highest value at an approximate mid-point between two electrical commutations, and then fall. With an optimum waveform, the torque applied by the electromagnets may be suitable for rotation and provide a substantially high level of engine smoothness. An overdrive waveform may have increasing current between electrical commutations from the beginning of the measurements until the last third of the measurement period. With an overdrive waveform, the PWM duty cycle may be too high for a delay applied between electrical commutations. Torque may be wasted because the electrical commutation may come late. In addition, the motor may rotate, but generate vibration and noise. In particular embodiments, an underdrive waveform cannot be evaluated. With an underdrive waveform, the energy supplied by the PWM-controlled electromagnets may be insufficient to maintain the rotation speed of the rotor. The movement of the rotor may be unable to follow the rotating field generated by the electromagnets, and the operation of the motor may be substantially unstable. In particular embodiments, a blocked state cannot be evaluated. With a blocked waveform, the rotor may be blocked by a drive load. As with an underdrive waveform, the energy supplied by the PWM-controlled electromagnets may be insufficient to maintain the rotation speed of the rotor; the movement of the rotor may be unable to follow the rotating field generated by the electromagnets; and the operation of the motor may be substantially unstable. While this disclosure applies particular labels to these waveforms, this disclosure contemplates any suitable labels for these waveforms.

For the start-up and acceleration of the rotor, particular embodiments may trace and evaluate the waveform between electrical commutations. If an optimum waveform is encountered, the PWM duty cycle may be increased—thus supplying more acceleration energy—until an overdrive waveform is detected. The time between electrical commutations may then be decreased until an optimum waveform is detected again. In particular embodiments, these steps may be repeated until the rotation speed is high enough for a safe transition to BEMF-based motor control. A blocked rotor may be hard to detect and should be avoided for a smooth transition to BEMF-based motor control. The detection of an optimum waveform detected at least once during start-up may be interpreted as indicating a motor rotation, and a blocked state may be excluded as a possibility. Particular embodiments may substantially disregard variance in drive load, and an ideal PWM duty cycle for the overall drive load may be selected empirically.

Figure 4:
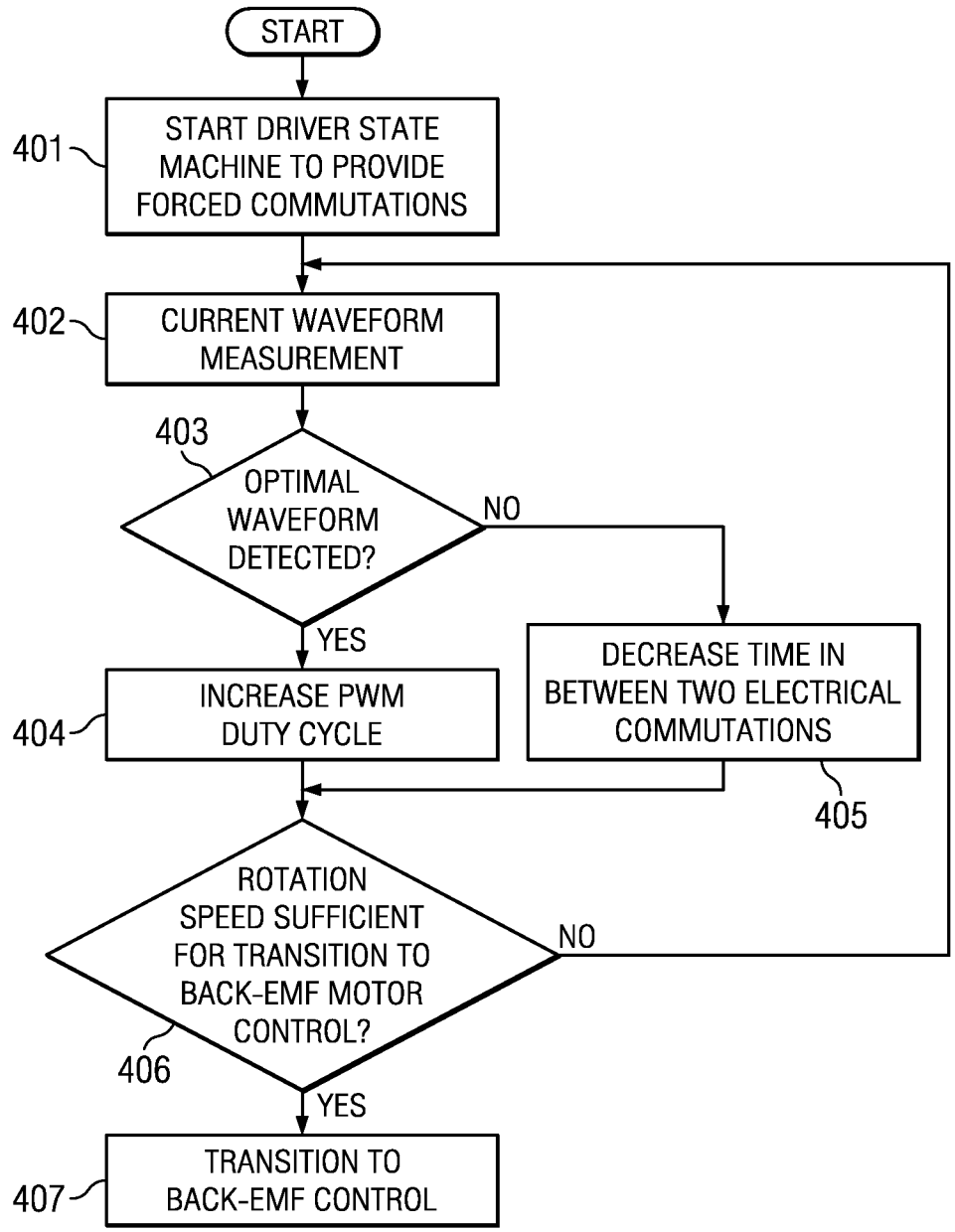
FIG. 4 illustrates an example method for starting a sensorless BLDC motor based on current-ripple analysis.

FIG. 4 illustrates an example method for starting a sensorless BLDC motor based on current-ripple analysis. The sensorless BLDC motor may include multiple electromagnets around one or more permanent magnets, and a controller coupled to the sensorless BLDC motor may transition the sensorless BLDC motor from an idle state to a rotating state by supplying PWM-configurable currents to the electromagnets and execute electrical commutations to provide accelerating torque (401). As an example and not by way of limitation, the controller may execute electrical commutations by going through the steps in FIG. 2 with a pre-determined delay between electrical commutations. The pre-determined delay may be estimated or empirically determined for a specific motor. With the sensorless BLDC in a rotating state, the controller may measure a current waveform induced by BEMF voltage (402). The controller may measure the BEMF-induced current waveform by sampling current at multiple times between electrical commutations, while an electromagnet is not being driven by the PWM-configurable currents.

The controller may then determine whether an optimal waveform is detected (403). As discussed above, an optimal waveform may be similar in shape to a rectified sine wave. It may monotonically increase from the first one of two electrical commutations to a maximal value at a mid-point between the two electrical commutations and monotonically decrease from the mid-point to the second one of the two electrical commutations. If an optimal waveform is detected in the current waveform, the controller may increase the duty cycle of the PWM-configurable currents by a pre-determined amount (404). If an overdrive waveform is detected in the current waveform, the controller circuit may decrease the delay time between electrical commutations (405). As discussed above, an overdrive waveform may monotonically increase from the first one of two electrical commutations until the last third of the measurement period between the two electrical commutations.

The controller may continue to increase the duty cycle of the PWM-configurable currents (404) until an overdrive waveform is detected or continue to decrease the delay time between electrical commutations (405) until an optimal waveform is detected. If the rotation speed of the rotor is sufficient for transition to BEMF-based motor control (406), the sensorless BLDC motor is transition to BEMF-based motor control (407).

FIG. 5 illustrates example waveforms measured by the example method of FIG. 4. In FIG. 5, four equally-spaced measurements are taken between two commutations. For a delay time T between two commutations, the first measurement may take place at $\frac{1}{8} \times T$ after the first commutation; the second measurement may take place at $\frac{3}{8} \times T$ after the first commutation; the third measurement may take place at $\frac{5}{8} \times T$ after the first commutation; and the fourth measurement may take place at $\frac{7}{8} \times T$ after the first commutation. With an optimal waveform, the sum of the second and third measured current values may be greater than the sum of the first and fourth measured current values. With an overdrive waveform, the sum of the first and second measured values may be smaller than the sum of the third and forth measured values. If more precision is desired, more measurement may be made between two commutations.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a circuit:
    measuring between two consecutive electrical commutations of a brushless direct-current (BLDC) motor a current through the BLDC motor, one or more pulse-width-modulation (PWM)-configurable signals driving the BLDC motor;
    determining a waveform of the current through the BLDC motor;
    if the waveform of the current through the BLDC motor comprises a first type, then increasing a duty cycle of each of one or more of the PWM-configurable signals driving the BLDC motor;
    if the waveform of the current through the BLDC motor comprises a second type, then decreasing a time interval between electrical commutations of the BLDC motor; and
    transitioning the BLDC motor to back electromotive force (BEMF)-based control if one or more criteria are substantially met, wherein one or more of the criteria comprise an amplitude of a voltage induced by BEMF in the BLDC motor reaching or exceeding a pre-determined threshold.

2. The method of claim 1, wherein the BLDC motor is a sensorless BLDC motor.

3. The method of claim 1, further comprising starting electrical commutation of the BLDC motor with a pre-determined time interval between electrical commutations of the BLDC motor.

4. The method of claim 1, wherein one or more of the criteria comprise a rotation speed of the BLDC motor reaching or exceeding a pre-determined threshold.

5. The method of claim 1, wherein one or more of the criteria comprise the waveform of the current through the BLDC motor becoming substantially consistent.

6. The method of claim 1, wherein the first type is substantially similar to a rectified sine wave.

7. The method of claim 1, wherein the first type comprises a wave that substantially monotonically rises for approximately a first half of a time interval between two consecutive electrical commutations of the BLDC motor and substantially monotonically falls for approximately a second half of the time interval.

8. The method of claim 1, wherein the second type comprises a wave that substantially monotonically rises for approximately a first two thirds of a time interval between two consecutive electrical commutations of the BLDC motor and substantially monotonically falls for approximately a final third of the time interval.

9. A circuit configured to:
    measure between two consecutive electrical commutations of a brushless direct-current (BLDC) motor a current through the BLDC motor, one or more pulse-width-modulation (PWM)-configurable signals driving the BLDC motor;
    determine a waveform of the current through the BLDC motor;
    if the waveform of the current through the BLDC motor comprises a first type, then increase a duty cycle of each of one or more of the PWM-configurable signals driving the BLDC motor;
    if the waveform of the current through the BLDC motor comprises a second type, then decrease a time interval between electrical commutations of the BLDC motor; and
    transition the BLDC motor to back electromotive force (BEMF)-based control if a rotation speed of the BLDC motor reaches or exceeds a pre-determined threshold, wherein one or more of the criteria comprise a rotation speed of the BLDC motor reaching or exceeding a pre-determined threshold.

10. The circuit of claim 9, wherein the BLDC motor is a sensorless BLDC motor.

11. The circuit of claim 9, further configured to start electrical commutation of the BLDC motor with a pre-determined time interval between electrical commutations of the BLDC motor.

12. The circuit of claim 9, wherein one or more of the criteria comprise the waveform of the current through the BLDC motor becoming substantially consistent.

13. The circuit of claim 9, wherein one or more of the criteria comprise an amplitude of a voltage induced by BEMF in the BLDC motor reaching or exceeding a pre-determined threshold.

14. The circuit of claim 9, wherein the first type is substantially similar to a rectified sine wave.

15. The circuit of claim 9, wherein the first type comprises a wave that substantially monotonically rises for approximately a first half of a time interval between two consecutive electrical commutations of the BLDC motor and substantially monotonically falls for approximately a second half of the time interval.

16. The circuit of claim 9, wherein the second type comprises a wave that substantially monotonically rises for approximately a first two thirds of a time interval between two consecutive electrical commutations of the BLDC motor and substantially monotonically falls for approximately a final third of the time interval.

17. A system comprising:
    a brushless direct-current (BLDC) motor; and
    a circuit coupled to the BLDC motor and configured to:
        measure between two consecutive electrical commutations of the BLDC motor a current through the BLDC motor, one or more pulse-width-modulation (PWM)-configurable signals driving the BLDC motor;
        determine a waveform of the current through the BLDC motor;

if the waveform of the current through the BLDC motor comprises a first type, then increase a duty cycle of each of one or more of the PWM-configurable signals driving the BLDC motor; and if the waveform of the current through the BLDC motor comprises a second type, then decrease a time interval between electrical commutations of the BLDC motor, wherein the second type comprises a wave that substantially monotonically rises for approximately a first two thirds of a time interval between two consecutive electrical commutations of the BLDC motor and substantially monotonically falls for approximately a final third of the time interval.

18. The system of claim 17, wherein the BLDC motor is a sensorless BLDC motor.

19. The system of claim 17, wherein the circuit is further configured to start electrical commutation of the BLDC motor with a pre-determined time interval between electrical commutations of the BLDC motor.

20. The system of claim 17, wherein the circuit is further configured to transition the BLDC motor to back electromotive force (BEMF)-based control if a rotation speed of the BLDC motor reaches or exceeds a pre-determined threshold.

21. The system of claim 20, wherein one or more of the criteria comprise a rotation speed of the BLDC motor reaching or exceeding a pre-determined threshold.

22. The system of claim 20, wherein one or more of the criteria comprise the waveform of the current through the BLDC motor becoming substantially consistent.

23. The system of claim 20, wherein one or more of the criteria comprise an amplitude of a voltage induced by BEMF in the BLDC motor reaching or exceeding a pre-determined threshold.

24. The system of claim 17, wherein the first type is substantially similar to a rectified sine wave.

25. The system of claim 17, wherein the first type comprises a wave that substantially monotonically rises for approximately a first half of a time interval between two consecutive electrical commutations of the BLDC motor and substantially monotonically falls for approximately a second half of the time interval.

* * * * *